United States Patent [19]

Wills

[11] 4,234,327
[45] Nov. 18, 1980

[54] COMPRESSED AIR SYSTEM HAVING AN AIR DRYER

[76] Inventor: Bill R. Wills, 4522-77th, Lubbock, Tex. 79424

[21] Appl. No.: 45,300

[22] Filed: Jun. 4, 1979

[51] Int. Cl.³ .................... B01D 46/42; B01D 50/00
[52] U.S. Cl. ........................................ 55/310; 55/325; 55/329; 55/385 R; 55/458
[58] Field of Search .............................. 55/184–186, 55/201, 212, 218, 318, 325, 329, 433, 447, 458, 310, 311, 385 R

[56] References Cited

U.S. PATENT DOCUMENTS

| | | | |
|---|---|---|---|
| 1,727,733 | 9/1929 | Stovall | 55/185 |
| 2,467,408 | 4/1949 | Semon | 55/325 |
| 2,777,533 | 1/1957 | Segrest | 55/185 |
| 2,952,331 | 9/1960 | Beach | 55/310 |
| 2,992,698 | 7/1961 | Pearson et al. | 55/325 |
| 3,345,807 | 10/1967 | Von Feldon | 55/433 |
| 3,997,303 | 12/1976 | Newton | 55/185 |
| 4,026,685 | 5/1977 | Grix | 55/218 |

FOREIGN PATENT DOCUMENTS 532653  8/1931  Fed. Rep. of Germany ............ 55/458

Primary Examiner—David L. Lacey
Attorney, Agent, or Firm—Wendell Coffee

[57] ABSTRACT

An air dryer of a compressed air system includes a vertical cylindrical tank with a downwardly directed entry pipe therein having a terminal to form liquid droplets on the bottom thereof. The tank has a manual drain valve on the bottom. A baffle near the top finishes separating any liquid from the compressed air.

10 Claims, 5 Drawing Figures

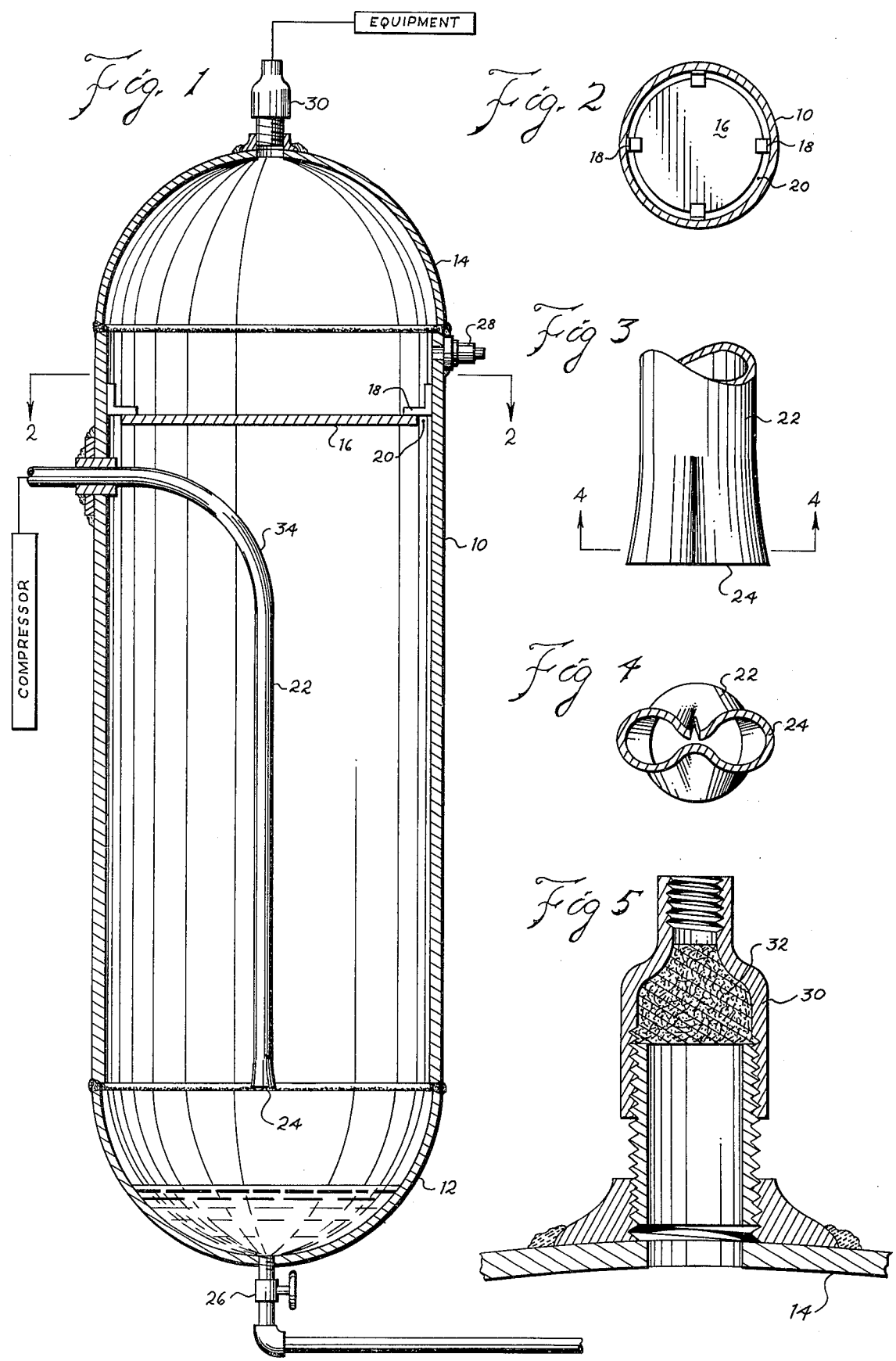

COMPRESSED AIR SYSTEM HAVING AN AIR DRYER

BACKGROUND OF THE INVENTION (1) Field of the Invention

This invention relates to gas separators and more particularly to the tank for removing liquids from compressed air.

(2) Description of the Prior Art

Compressed air is widely used for multiple purposes in shops and small processing plants. E.g., compressed air is used in cotton gins for operating tools and other purposes.

Normally, the air is compressed by mechanical compressors which are lubricated. When the air is compressed and subsequently cooled, the humidity of the air will condense. In addition, some of the lubricating oil of the compressor will be carried over into the compressed air. It is highly desirable, if not essential, to remove this liquid which is both water and condensed lubricating oil from the compressed air for the proper operation of the equipment. Sometimes foreign matter, such as flakes of rust or the like, enter into the compressed air which must be removed for proper operation of the equipment.

Before this application was filed, applicant caused a search to be made in the United States Patent and Trademark Office wherein the following references were found.

MACLACHLAN, U.S. Pat. No. 1,948,180
BUCHS, U.S. Pat. No. 2,129,490
PACKIE, U.S. Pat. No. 2,547,769
SOKOLOWSKI, U.S. Pat. No. 3,751,886
FRANTZ, U.S. Pat. No. 4,052,178

SOKOLOWSKI discloses a vertical steam drum having two moisture separation stages. The incoming steam is directed upward past a first separation stage having swirl vanes. Chevron separators form the second stage.

PACKIE ET AL. discloses a separator which has a series of slots 10 in an entry pipe BUCHS discloses a cleaner wherein a flow of air directed upward impinges on a cool plate which causes the dropping out of oil and water droplets. Afterwards, the air passes through a very large bed of filter material.

The other two patents do not appear to be as pertinent as those discussed above.

SUMMARY OF THE INVENTION (1) New and Different Function

I have invented a effective air cleaner which is inexpensive to manufacture and maintain and which is very effective for the normal usage of cleaning compressed air. The liquids collect in the bottom of the vessel and are daily drained through a manual valve. I have found that the liquid collected, being a mixture of water and oil, form a very sticky, gummy substance and that use of any sort of automatic drain equipment is unsatisfactory because of the maintenance problems associated with cleaning the accumulation from them.

The incoming air is directed downwardly through a nozzle or outlet on the end of the entry pipe having portions adapted for the separation of liquid droplets. Thereafter, the air passes from a bottom chamber to an upper chamber by a baffle which extends substantially entirely across the vessel.

The outlet connection includes a standard pipe reduction packed with filter material whereby any solid particle such as rust or the like may be caught and not go through the outlet to the equipment to be operated.

Thus, it may be seen that the total function of my combination far exceeds the sum of the individual functions of the plates, valves, pipes, etc.

(2) Objects of this Invention

An object of this invention is to produce clean dry compressed air with a compressed air system.

Further objects are to achieve the above with a device that is sturdy, compact, durable, lightweight, simple, safe, efficient, versatile, ecologically compatible, energy conserving, and reliable, yet inexpensive and easy to manufacture, install, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a axial section of an air drier according to this invention.

FIG. 2 is a cross sectional view showing the baffle taken substantially on line 2—2 of FIG. 1.

FIG. 3 is an enlarged detail of the terminal to the entry pipe.

FIG. 4 is a cross sectional view taken substantially on line 4—4 of FIG. 3.

FIG. 5 is an axial sectional view of the outlet connection.

DESCRIPTION OF THE PREFERRED EMBODIMENT

Referring to the drawings, there may be seen an air drier having an upright cylindrical vessel 10. The vessel has hemispherical bottom head 12, hemispherical top head 14, and and a cylindrical section between the two heads. The axis of the cylindrical section is vertical. The height of the vessel will be approximately two and one-half times the diameter. Specifically, I have had good success with a vessel 14" (36 cm) in diameter and 33" (84 cm) in overall height.

Solid disc baffle 16 is located within the tank about two-thirds diameter from the top of the tank. Stated otherwise, the baffle 16 is 2" (5 cm) below the weld of the top head 14. The baffle is attached by four cleats 18 welded to the internal walls of the tank and to the baffle. The baffle extends across about 93% of the internal diameter of the vessel 10. Therefore, there is a small annular passage 20 around the perimeter of the baffle 16. Specifically, I have had good success using a baffle with 13.5 inch diameter so that the width of the passage 20 is about one-fourth inch (6 mm). The baffle 16 divides the vessel into an upper and lower diameter.

Entry pipe 22 enters through the wall of the vessel below the baffle 16. The entry pipe is connected to a compressor. Specifically, I have had good success with the entry pipe coming through the vessel wall about 1 diameter (36 cm) below the top of the vessel. The entry pipe extends downward to at about the axis of the vessel to a point slightly less than one-half the diameter. Specifically, I have had good success with the entry pipe being six inches (15 cm) from the bottom of the vessel. The downwardly pointing terminal 24 of the entry pipe is shaped to assist in forming droplets of liquid to be dropped into the bottom. Referring to the detail drawing of the terminal 24 to the entry pipe, it may be seen that the pipe, which is about a nominal 1" pipe, is pressed together at the terminal to form two separate outlets. The pipe 22 is restricted at the terminal 24 because it is pressed together. With this configuration, I find that there is a good formation of droplets of liquid to separate the liquid from the gas. The terminal 24 is formed by making a single press with a chisel-shaped tool diametrically against the end or terminal 24 of the entry pipe 22. Sometimes the tool cuts the pipe as shown in FIG. 4.

Manual drain valve 26 is attached to the liqid drain from the bottom of vessel 10. As stated above, I find it much better to provide a manual drain which can be operated manually daily. I have found this is sufficient to keep accumulation of liquid from the bottom of the tank and that it operates much more satisfactorily and trouble free than automatic systems to automatically open to drain the bottom of the tank.

Pressure relief valve 28 is mounted on the tank above the baffle 16.

The air outlet at the top of the tank includes a threaded collar attached as by welding to the top of the hemispherical top head 14. Reducer 30, reducing from a nominal 2" pipe size to a nominal 1" pipe size, is attached to a nipple in the collar. The reducer 30 is filled with filter material 32. Equipment to be operated is connected to the outlet which is the reducer 30.

The entry pipe 22 has a long radius bend 34 therein so that it may be assembled within the vessel after the vessel is built.

As an aid to correlating the terms of the claims to the exemplary drawing, the following catalog of elements is provided:
- 10 vessel
- 12 bottom head
- 14 top head
- 16 baffle
- 18 cleats
- 20 passage
- 22 entry pipe
- 24 terminal
- 26 drain valve
- 28 relief valve
- 30 reducer
- 32 filter material
- 34 bend The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a compressed air system having
   a. an air compressor, and
   b. equipment using compressed air; wherein the improvement comprises an air drier including:
   c. a vessel having
      (i) a cylindrical shell with
      (ii) two arcuate heads,
      (iii) the cylindrical shell having a vertical axis,
   d. the height of the vessel being about two and one half times the diameter,
   e. a diametrical baffle in the vessel about two-thirds diameter from the top of the vessel,
   f. said baffle extending over most of the cross sectional area of the vessel,
   g. a pressure relief valve on the tank above the baffle,
   h. an entry pipe entering the vessel below the baffle,
   j. the air compressor connected to the entry pipe,
   k. the entry pipe terminating with a restricted downward pointing terminal to assist in the forming of droplets of liquid about one-half diameter from the bottom of the tank,
   m. a manual drain valve on the bottom of the tank,
   n. an outlet connected to the equipment using air, and
   o. a filter in the outlet at the top of the tank.

2. The compressed air system as defined in limitations a. through o. of claim 1 further comprising:
   p. said heads being hemispherically shaped.

3. The compressed air system as defined in limitations a. through o. of claim 1 further comprising:
   p. said entry pipe entering the vessel about one diameter below the top of the vessel.

4. The compressed air system as defined in limitations a. through o. of claim 1 further comprising:
   p. said terminal having the walls of the pipe squeezed together so that the flow of air entering the vessels is divided into two streams.

5. The compressed air system as defined in limitations a. through o. of claim 1 further comprising: said baffle extending over about 93% of the area of the vessel.

6. The compressed air system as defined in limitations a. through o. of claim 1 further comprising:
   p. a reducer at the top of the vessel forming said outlet with
   q. filter material therein, thus forming said filter.

7. The compressed air system as defined in limitations a. through q. of claim 6 further comprising: said baffle extending over about 93% of the area of the vessel.

8. The compressed air system as defined in limitations a. through q. of claim 7 further comprising:
   r. said terminal having the walls of the pipe squeezed together so that the flow of air entering the vessels is divided into two streams.

9. The compressed air system as defined in limitations a. through r. of claim 8 further comprising:
   s. said heads being hemispherically shaped.

10. The compressed air system as defined in limitations a. through s. of claim 9 further comprising:
    t. said entry pipe entering the vessel about one diameter below the top of the vessel.

* * * * *